US008245287B2

(12) United States Patent
Hepburn

(10) Patent No.: US 8,245,287 B2
(45) Date of Patent: Aug. 14, 2012

(54) SERVER MESSAGE BLOCK (SMB) SECURITY SIGNATURES SEAMLESS SESSION SWITCH

(75) Inventor: Matthew Ian Hepburn, Quincy, MA (US)

(73) Assignee: ViaSat, Inc., Carlsbad, CA (US)

( * ) Notice: Subject to any disclaimer, the term of this patent is extended or adjusted under 35 U.S.C. 154(b) by 989 days.

(21) Appl. No.: 12/240,141

(22) Filed: Sep. 29, 2008

(65) Prior Publication Data
US 2009/0089873 A1 Apr. 2, 2009

Related U.S. Application Data

(60) Provisional application No. 60/976,677, filed on Oct. 1, 2007.

(51) Int. Cl.
*H04L 29/06* (2006.01)
*H04L 9/00* (2006.01)
(52) U.S. Cl. .............................. 726/12; 726/14; 713/168
(58) Field of Classification Search .................. None
See application file for complete search history.

(56) References Cited

U.S. PATENT DOCUMENTS

| 5,844,885 | A | 12/1998 | Grob et al. |
| 6,104,716 | A * | 8/2000 | Crichton et al. ............. 370/401 |
| 6,263,020 | B1 | 7/2001 | Gardos et al. |
| 6,310,857 | B1 | 10/2001 | Duffield et al. |
| 6,584,567 | B1 | 6/2003 | Bellwood et al. |
| 6,701,372 | B2 | 3/2004 | Yano et al. |
| 6,839,761 | B2 * | 1/2005 | Kadyk et al. ................. 709/229 |
| 6,850,541 | B2 | 2/2005 | Gross |
| 6,910,079 | B2 | 6/2005 | Zimmermann et al. |
| 6,996,841 | B2 * | 2/2006 | Kadyk et al. ..................... 726/12 |
| 7,111,092 | B1 | 9/2006 | Mitten et al. |
| 7,251,246 | B2 | 7/2007 | Ross |
| 7,266,613 | B1 | 9/2007 | Brown et al. |
| 7,269,659 | B2 * | 9/2007 | Kadyk et al. .................. 709/229 |

(Continued)

FOREIGN PATENT DOCUMENTS
WO    WO 01/03398 A    1/2001
(Continued)

OTHER PUBLICATIONS

PCT International Search Report and Written Opinion mailed Mar. 11, 2009, International Publication No. PCT/US2008/078161, 12 pages.

(Continued)

*Primary Examiner* — Christopher Revak
(74) *Attorney, Agent, or Firm* — Kilpatrick Townsend & Stockton LLP

(57) ABSTRACT

The present invention relates to systems, apparatus, and methods of securely transmitting data between a client and a server. The method includes receiving an initial security message from the client. The security message is to establish security between the server and the client. Further, the client's security parameters are set to enabled and not required. The method further includes forwarding the initial security message to the server and intercepting a security response from the server. The response includes security data and security parameters set to enabled and required. The method includes extracting the security data from the security response, and using the security data to establish a secure socket connection between the proxy server and the server. Furthermore, the method alters the request by changing the security parameters to not enabled and not required, and transmits the altered request and establishes a non-secure socket connection.

20 Claims, 6 Drawing Sheets

U.S. PATENT DOCUMENTS

| | | | |
|---|---|---|---|
| 7,272,111 B2 | 9/2007 | Zukerman et al. | |
| 7,277,391 B1 | 10/2007 | Aweya et al. | |
| 7,284,065 B2 | 10/2007 | Agarwal et al. | |
| 7,360,075 B2 * | 4/2008 | VanHeyningen et al. | 713/151 |
| 7,383,338 B2 | 6/2008 | Allen | |
| 7,443,804 B2 | 10/2008 | Cheung et al. | |
| 7,450,602 B2 | 11/2008 | Vazquez | |
| 7,543,073 B2 | 6/2009 | Chou et al. | |
| 7,564,901 B2 | 7/2009 | Wang et al. | |
| 2001/0032269 A1 | 10/2001 | Wilson | |
| 2002/0080721 A1 | 6/2002 | Tobagi et al. | |
| 2002/0131419 A1 | 9/2002 | Tamai | |
| 2003/0053482 A1 | 3/2003 | Li | |
| 2003/0061371 A1 | 3/2003 | Deshpande | |
| 2003/0061387 A1 * | 3/2003 | Brown et al. | 709/246 |
| 2003/0088690 A1 | 5/2003 | Zuckerman et al. | |
| 2003/0182437 A1 | 9/2003 | Kobayashi et al. | |
| 2004/0016000 A1 | 1/2004 | Zhang et al. | |
| 2004/0199659 A1 | 10/2004 | Ishikawa et al. | |
| 2005/0063392 A1 | 3/2005 | Ofuji et al. | |
| 2005/0071876 A1 | 3/2005 | Van Beek | |
| 2005/0177866 A1 * | 8/2005 | Kirsch | 726/3 |
| 2008/0126794 A1 * | 5/2008 | Wang et al. | 713/151 |
| 2011/0173436 A1 * | 7/2011 | Vanheyningen et al. | 713/150 |

FOREIGN PATENT DOCUMENTS

WO    WO 2009/045963 A1 *    4/2009

OTHER PUBLICATIONS

U.S. Appl. No. 12/252,181, filed Oct. 15, 2008.

U.S. Appl. No. 12/172,925, Notice of Allowance mailed Apr. 13, 2010, 12 pages.

U.S. Appl. No. 12/172,920, Office Action mailed Mar. 8, 2010, 12 pages.

* cited by examiner

SERVER MESSAGE BLOCK (SMB) SECURITY SIGNATURES SEAMLESS SESSION SWITCH

PRIORITY CLAIM

The application claims priority of U.S. Provisional Application Ser. No. 60/976,677, filed on Oct. 1, 2007, entitled SERVER MESSAGE BLOCK (SMB) SECURITY SIGNATURES SEAMLESS SESSION SWITCH, which in incorporated by reference in its entirety for any and all purposes.

RELATED APPLICATIONS

U.S. Provisional Patent Application Ser. No. 60/949,492 entitled, "METHODS AND SYSTEMS FOR PERFORMING A PREFETCH ABORT OPERATION", filed on Jul. 12, 2007; U.S. Provisional Patent Application Ser. No. 60/949,493 entitled, "METHODS AND SYSTEMS FOR JAVA SCRIPT PARSING", filed on Jul. 12, 2007; U.S. Provisional Patent Application Ser. No. 60/949,494 entitled, "TIME-SLICE FLOW CONTROL", filed on Jul. 12, 2007; and U.S. Provisional Patent Application Ser. No. 60/949,495 entitled, "METHODS AND SYSTEMS FOR BANDWIDTH MEASUREMENT", filed on Jul. 12, 2007 are all incorporated by reference for any and all purposes.

FIELD OF THE INVENTION

The present invention relates, in general, to network communications and, more particularly, to seamless session switching.

BACKGROUND

Presently, in order to securely provide acceleration for server message block (SMB) data, the data must be snooped as it is being transmitted. Based on the snooped data, predictions may be made as to the files being transferred, the source of the files, the destination of the files, etc. Such an ad hoc method of accelerating SMB data transfers provides very little benefit and is extremely inaccurate and cumbersome.

Alternatively, the message authentication codes (MACs) for SMB data transmissions may be turned off in order to allow for acceleration. However, by turning off MACs, the transmitted data becomes completely insecure and susceptible to hacking, data theft, etc. Accordingly, methods and systems are needed to effectively accelerate SMB transmissions while maintaining the security of the transmissions. Hence, improvements in the art are needed.

BRIEF SUMMARY

Embodiments of the present invention are directed to a method of securely transmitting data between a client and a server. The method includes receiving, at a client proxy, an initial security message from the client. The security message is to establish security between the server and the client. Further, the client's security parameters are set to enabled and not required. The method further includes forwarding the initial security message to the server and intercepting, at a proxy server, a security response from the server.

The response includes security data and security parameters set to enabled and required. The method further includes extracting the security data from the security response, and using the security data to establish a secure socket connection between the proxy server and the server. Furthermore, the method alters the request by changing the security parameters to not enabled and not required, transmits the altered request to the client, and establishes a non-secure socket connection between the proxy client and the client.

According to a further embodiment, a system for securely transmitting data between a client and a server is described. The system includes a client system which includes a proxy client is configured to receive an initial security message from the client. The client's security parameters are set to enabled and not required. The proxy client is further configured to forward the initial security message. The system further includes a content server configured to transmit a security response. The response includes security data and security parameters set to enabled and required.

The system further includes a proxy server coupled with the content server over a low latency communications link and the client system via the proxy client over a high latency communications link. The proxy server is configured to intercept the security response and extract the security data from the security response. The proxy server is further configured to use the security data to establish a secure socket connection between the proxy server and the content server, alter the request by changing the security parameters to not enabled and not required, and transmit the altered request to the client. The proxy client is further configured to establish a non-secure socket connection between the proxy client and the client.

In an alternative embodiment, a machine-readable medium for securely transmitting data between a client and a server. The machine-readable medium includes instructions for receiving, at a client proxy, an initial security message from the client. The security message is to establish security between the server and the client. Further, the client's security parameters are set to enabled and not required. The machine-readable medium further includes instructions for forwarding the initial security message to the server and intercepting, at a proxy server, a security response from the server.

The response includes security data and security parameters set to enabled and required. The machine-readable medium further includes instructions for extracting the security data from the security response, and using the security data to establish a secure socket connection between the proxy server and the server. Furthermore, the machine-readable medium includes instructions to alter the request by changing the security parameters to not enabled and not required, transmit the altered request to the client, and establish a non-secure socket connection between the proxy client and the client.

A further understanding of the nature and advantages of the present invention may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Aspects of the disclosure relate to bypassing server message block (SMB) security over portions of a network in order to accelerate traffic over the network, while maintaining a level of security. In one embodiment, a client may have SMB security setting set as optional, while the server with which the client is in communication has the SMB security setting set as required. In this situation, in order to accelerate communication between the client and the server, a proxy client and a proxy server may be located between the client and the server.

In one embodiment, the proxy server may intercept an SMB security establishment message from the server and set up a secure socket with the server to appear to the server that the secure socket has been established with the client. Accordingly, communications between the proxy server and the server are made in accordance with SMB security standards while communications between the proxy server and the client (through the proxy client) can be modified from the SMB standard, and thus be accelerated. This exchange can be accomplished without the server being aware of any such change.

Figure 1:
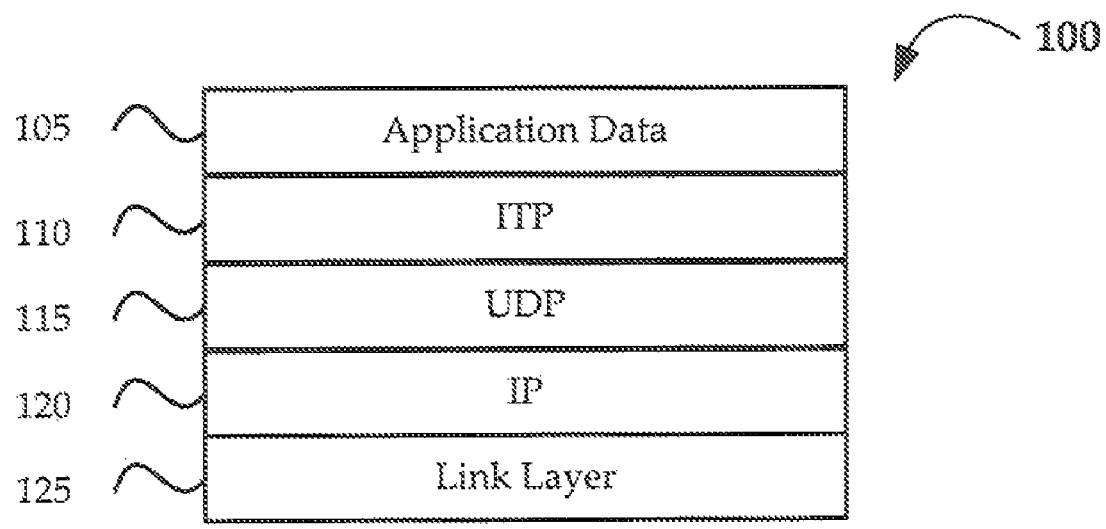
FIG. 1 is a block diagram illustrating a protocol stack, according to embodiments of the present invention.

According to further aspects of the disclosure, the packets may be transmitted over a protocol stack. In one embodiment, a network protocol, according to embodiments of the disclosure, may be added to the protocol stack in order to facilitate transmission of information over a high latency link (e.g., high latency link 220 in FIG. 2). The protocol may be inserted onto the stack to sit on top of the user datagram protocol (UDP) 115 layer as show in protocol stack 100 of FIG. 1. In one embodiment, the protocol may be Intelligent Compression Technology's™ (ICT) transport protocol (ITP)™ 110 sitting on top of UDP layer 115. The UDP protocol is recognized and supported by many network types and also provides a port address for level-4 switching devices. However, because UDP does not provide reliable delivery, packet sequencing, or flow control, ITP is placed on top of UDP to provide these and other functions.

Protocol stack 100 may also include link layer 125 (e.g., a physical link, a virtual link, etc.), Internet protocol (IP) layer 120 (e.g., for access to the world wide web, the Internet, etc.) and application data layer 105 (e.g., web browser, email client, etc.). Nonetheless, additional and/or alternative protocols and layers may be used and/or added.

In one embodiment, ITP may compress data received from application data layer 105. Further, the ITP protocol may be configured to provide fast delivery of compressed data. ITP may also provide a buffering system that implements multiple queues at different priority levels. The queues may be configured to allow high priority packets to be delivered at a faster rate than low priority packets. A further feature of ITP is that it is configured to be able to send partial packets. Partial packets may be sent when no additional data is coming to fill up the packets, as opposed to delaying transmission in order to wait to transmit a full packet. An additional feature of the ITP protocol is that it is an "application-aware" protocol. As such, ITP is configured to optimize transmission of packets based on requirements and/or needs of individual applications.

Figure 2:
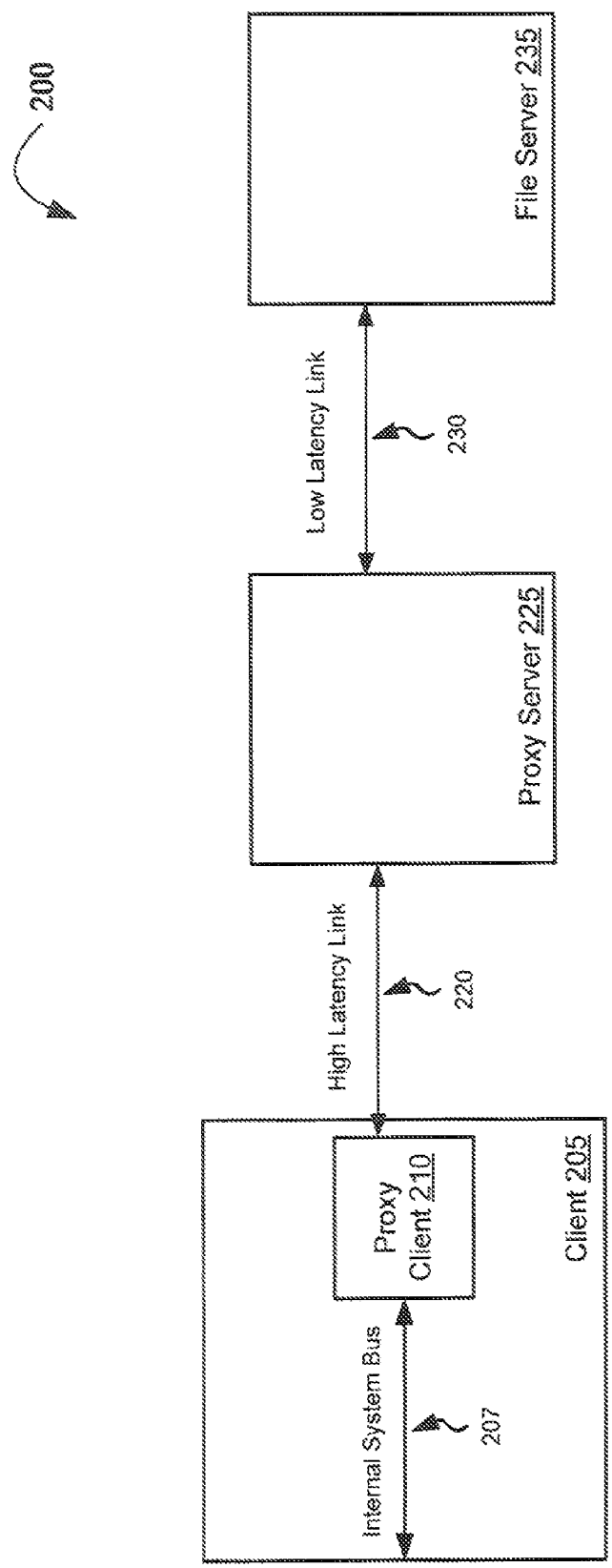
FIG. 2 is a block diagram illustrating a system for implementing aspects of the present invention.

Referring to FIG. 2, which illustrates one embodiment of a network 200 in accordance with aspects of the present disclosure. In one embodiment, network 200 may be configured to transmit SMB based communications between a client 205 and a file server 235. In one embodiment, client 205 and file server 235 may be Microsoft™ Windows based systems (e.g., Windows 95, Windows 98, Windows ME, Windows 2000, Windows XP, Windows Server 2003, Windows Vista, etc.); however, other systems may be used. Client 205 may transmit a request for an initialization of an SMB protocol based connection to file server 235. The request may include information regarding the versions of the SMB protocol in which client 205 is able to communicate. In one embodiment, client 205's SMB security parameters are set by two registry settings. The settings may be, for example, that security settings are "enabled," but "not required", "enabled" and "required", or "not enabled" and "not required." In other words, client 205 can optionally receive and transmit unsecured communications to/from file server 235. Thus, if client 205 has security settings set to "enabled" and "required" and client 205 receives a response from file server 235 which indicates that security signatures are "not enabled", then client 205 terminates the SMB session. However, if client 205 has security signatures "enabled" but "not required" and receives a response that indicates security signatures are "not enabled" on file server 235, client 205 may not use security signatures during the SMB session.

Client 205 may include a proxy client 210 coupled with client 205 via an internal system bus 207. In one embodiment, proxy client 210 may be a software application running on client 205. Proxy client 210 may intercept network communications originating from and/or transmitted to client 205. As such, proxy client 210 may intercept the SMB security setup message from client 205. In one embodiment, proxy client 210 analyzes the setup message and because it determines that the message is an SMB security setup request, proxy client 210 may forward the message over a high latency link 220 (e.g., a dial-up connection, a satellite link, a cellular link, a wireless link, etc.) to a proxy server 225.

In one embodiment, proxy server 225 intercepts network communications transmitted to and/or from file server 235. Similar to proxy client 210, proxy server 225 may analyze the message and because it determines that the message is an SMB security setup request, proxy server 225 may then forward the message to file server 235 via low latency link 230 (e.g., a cable modem link, a digital subscriber line (DSL), a broadband connection, etc.). Upon receipt of the SMB security setup request, file server 235 may transmit an SMB security session setup response. In one embodiment, the response may have security parameters set to "enabled" and "required." Stated differently, file server 235 may not be able to receive or transmit unsecured communications to/from client 205.

In a further embodiment, proxy server 225 may intercept the response from file server 235. Proxy server 225 may alter the response by changing the SMB security parameters to "not enabled" and "not required." Furthermore, proxy server 225 may extract security data from the response to be used to establish an SMB secure socket with file server 235. In one embodiment, the security data may include a session key, checksum value, a message authentication code (MAC), etc.

Furthermore, proxy server 225 may transmit the altered response via high latency link 220 to proxy client 210. In one embodiment, the altered response may be transmitted to client proxy 210 using acceleration (e.g., using the ITP protocol discussed above). Consequently, because the SMB secure session is now not required between proxy server 225 and proxy client 210, any number of acceleration techniques may be employed to speed up transmission over high latency link 220.

In one embodiment, proxy client 210 may, based on the altered response, establish an SMB socket between proxy client 210 and client 205. As a result, only the connection between client 205 and proxy client 210, and the connection between proxy server 225 and file server 235 implement SMB sockets. Thus, client 205 and file server 235 believe that the entire connection between them is using an SMB socket.

Figure 3:
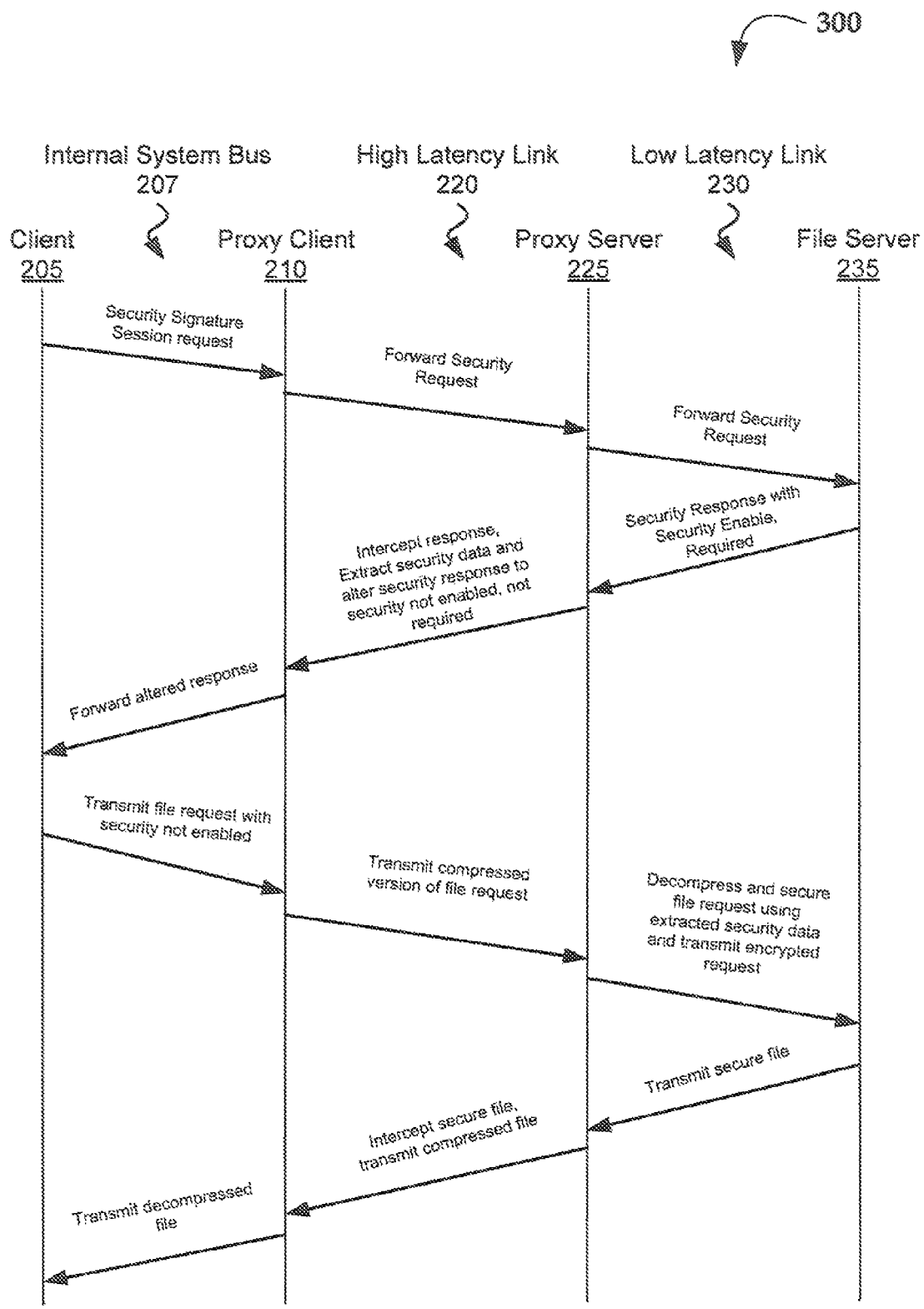
FIG. 3 is a flow diagram illustrating a flow diagram, according to one embodiment of the present invention.

Turning now to FIG. 3 which is a communication flow diagram 300 illustrating one embodiment of the communications between client 205, proxy client 210, proxy server 225 and file server 235 described above. In one embodiment, client 205 may transmit an SMB security setup request to file server 235, which is intercepted and forwarded by both proxy client 210 and proxy server 225 to file server 235. Subsequently, file server 235 responds to client 205's request with an SMB security session setup response. However, instead of forwarding the response, proxy server 225 may alter the response to have security parameters set to "not enabled" and "not required," and transmit the altered response to proxy client 210.

Furthermore, proxy server 225 may then establish an SMB secure socket with file server 235, which appears to file server 235 that the socket has been established with client 205. Further, proxy client 210 establishes an SMB socket with client 205, which appears to client 205 that the SMB socket has been established with file server 235 with security parameters set to "not enabled" and "not required."

In one embodiment, client 205 may transmit a file request to file server 235. The file request may be, for example, a file delete, a file move, a file copy, a directory delete, a directory copy, a directory move, etc. Other request types may be transmitted (e.g., printer related requests, serial port requests, etc.). The file request may be transmitted without security "enabled" or "required" in accordance with the established socket between client 205 and proxy client 210. Proxy client 210 then transmits a compressed version of the file request (i.e., using the ITP protocol) to proxy server 225. The request may then be decompressed by proxy server 225. Proxy server 225 may then secure the file request (according to the established secure socket) and transmit the secure file request to file server 235 through the secure socket.

In one embodiment, file server 235 may, upon receipt of the secure file request, process the request and transmit the requested file through the secure socket to proxy server 225. Furthermore, proxy server 225 intercepts the secure file, compresses it and transmits it to proxy client 210, for example, without requiring SMB security. Upon receipt of the compressed file, proxy client 210 may decompress the file and transmit it through the established socket to client 205.

In further embodiments, subsequent file and other requests to/from client 205 and/or to/from file server 235 may appear to client 205 to be completely unsecured and may appear to file server 235 to be completely secure according to SMB security requirements. Thus, complying with file server 235's security parameters and allowing communications over high latency link 220 to be altered and accelerated.

Figure 4:
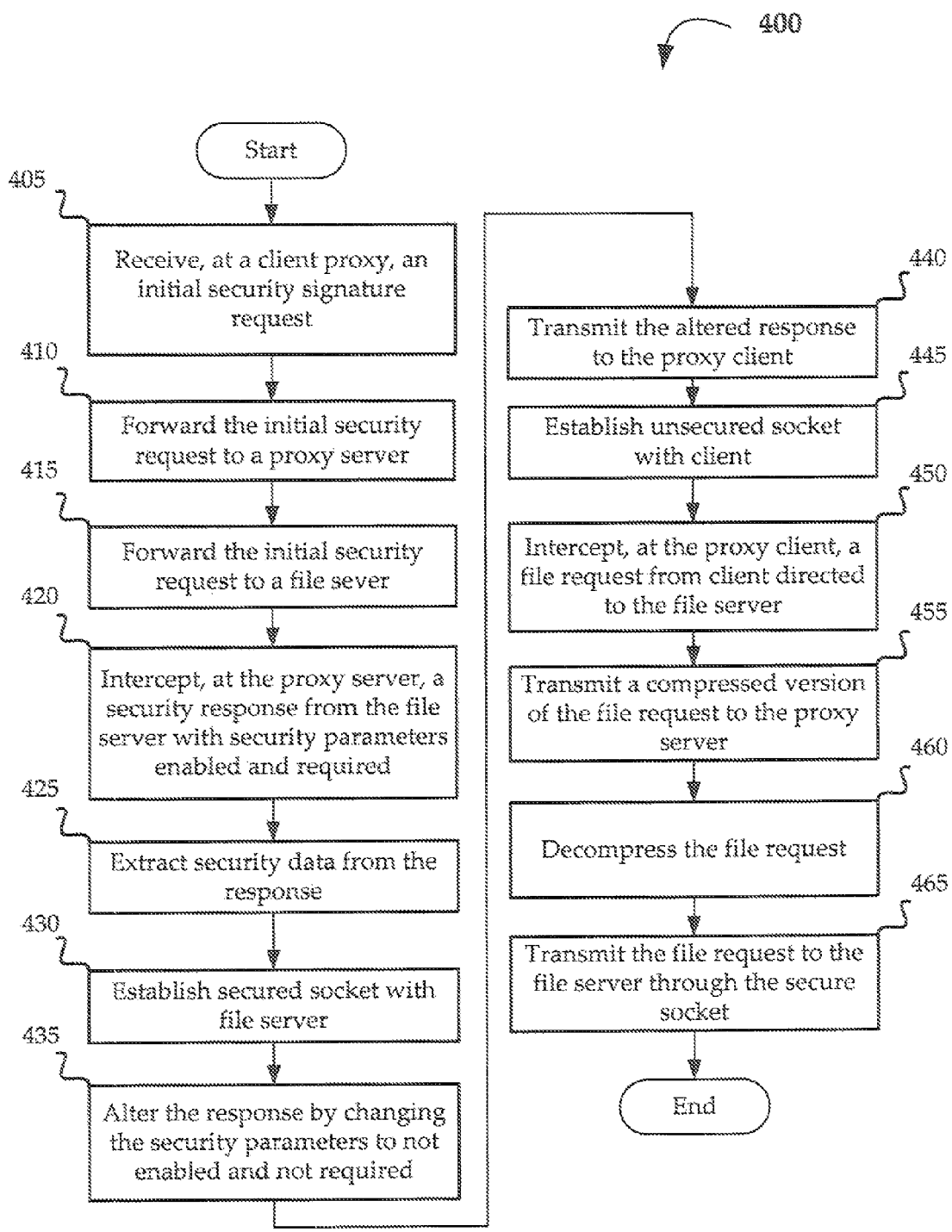
FIG. 4 is a flow diagram illustrating a flow diagram, according to one embodiment of the present invention.

Turning now to FIG. 4 which illustrates a method 400 according to embodiments of the present disclosure. At process block 405, an initial security setup message may be received at a client proxy (e.g., client proxy 210 (FIG. 2)). The security parameters of the setup message may be set to "enabled" but "not required." The unaltered message may then be allowed to be forwarded through the network until it reaches a file server (e.g., file server 235 (FIG. 2)) (process blocks 410 and 415).

At process block 420, the proxy server may intercept a security response message from the file server. The message may include security parameters which are set to "enabled" and "required." At process block 425, the proxy server may extract security data from the response message. In one embodiment, the security information may be MAC information which includes checksum information and session key information. Using the security information, the proxy server may establish a secure socket connection with the file server according to the file server's security parameters (process block 430).

At process block 435, the proxy server may alter the response by changing the security parameters to "not enabled" and "not required." In one embodiment, the response may be altered by zeroing out the security bits within the response. At process block 440, the proxy server may transmit the altered response to the proxy client. Based on the response received from the proxy server, the proxy client may then establish an unsecured socket with the client (process block 445).

At process block 450, the proxy client may intercept a file request from the client directed to the file server. The proxy client may then compress the file request and transmit the compressed version of the file request to the proxy server (process block 455). Upon receipt of the compressed file request, the proxy server may decompress the file request (process block 460). At process block 465, the proxy server may then transmit the file request through the secure socket to the file server.

A number of variations and modifications of the disclosed embodiments can also be used. For example, multiple clients and servers may be implemented in network 200 (FIG. 2). In addition, a variety of acceleration techniques may be implemented to speed up low latency link 220 (FIG. 2). It should be appreciated that additional network types and/or network configurations not specifically mentioned may also be used.

Figure 5:
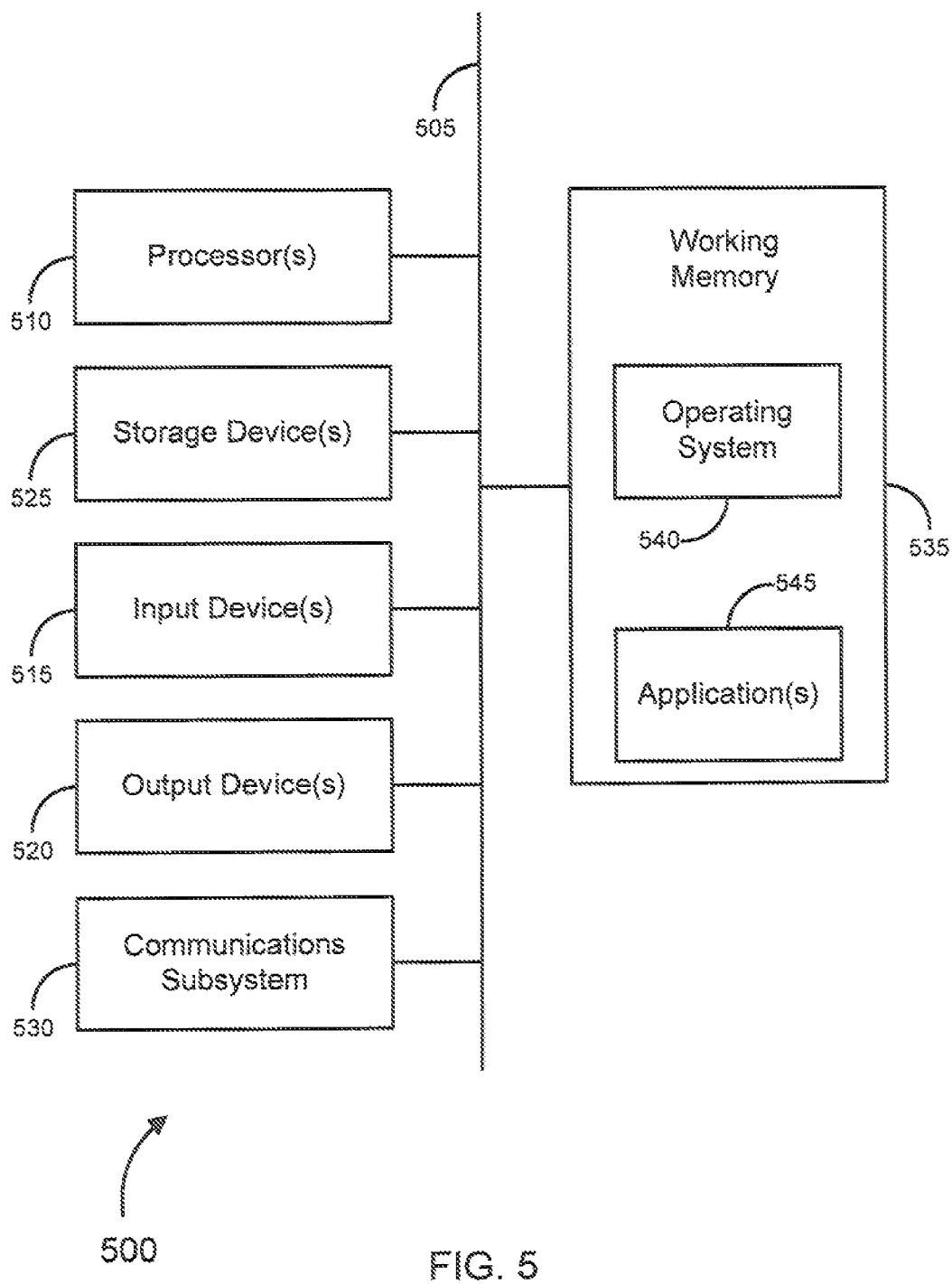
FIG. 5 is a generalized schematic diagram illustrating a computer system, in accordance with various embodiments of the invention.

FIG. 5 provides a schematic illustration of one embodiment of a computer system 500 that can perform the methods of the invention, as described herein, and/or can function, for example, as any part of client 305, proxy server 320, or content server 330 in FIG. 3. It should be noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements can include one or more processors 510, including without limitation one or more general-purpose processors and/or one or more special-purpose processors (such as digital signal processing chips, graphics acceleration chips, and/or the like); one or more input devices 515, which can include without limitation a mouse, a keyboard and/or the like; and one or more output devices 520, which can include without limitation a display device, a printer and/or the like.

The computer system 500 may further include (and/or be in communication with) one or more storage devices 525, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 500 might also include a communications subsystem 530, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 530 may permit data to be exchanged with a network (such as the network described below, to name one example), and/or any other devices described herein. In many embodiments, the computer system 500 will further comprise a working memory 535, which can include a RAM or ROM device, as described above.

The computer system 500 also can comprise software elements, shown as being currently located within the working memory 535, including an operating system 540 and/or other code, such as one or more application programs 545, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and or provided in an installation package, such that the storage medium can be used to program a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 500) to perform methods of the invention. According to a set of embodiments, some or all of the procedures of such methods are performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another machine-readable medium, such as one or more of the storage device(s) 525. Merely by way of example, execution of the sequences of instructions contained in the working memory 535 might cause the processor(s) 510 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 500, various machine-readable media might be involved in providing instructions/code to processor(s) 510 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 525. Volatile media includes, without limitation dynamic memory, such as the working memory 535. Transmission media includes coaxial cables, copper wire and fiber optics, including the wires that comprise the bus 505, as well as the various components of the communication subsystem 530 (and/or the media by which the communications subsystem 530 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500. These signals, which might be in the form of electromagnetic signals, acoustic signals, optical signals and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc., carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
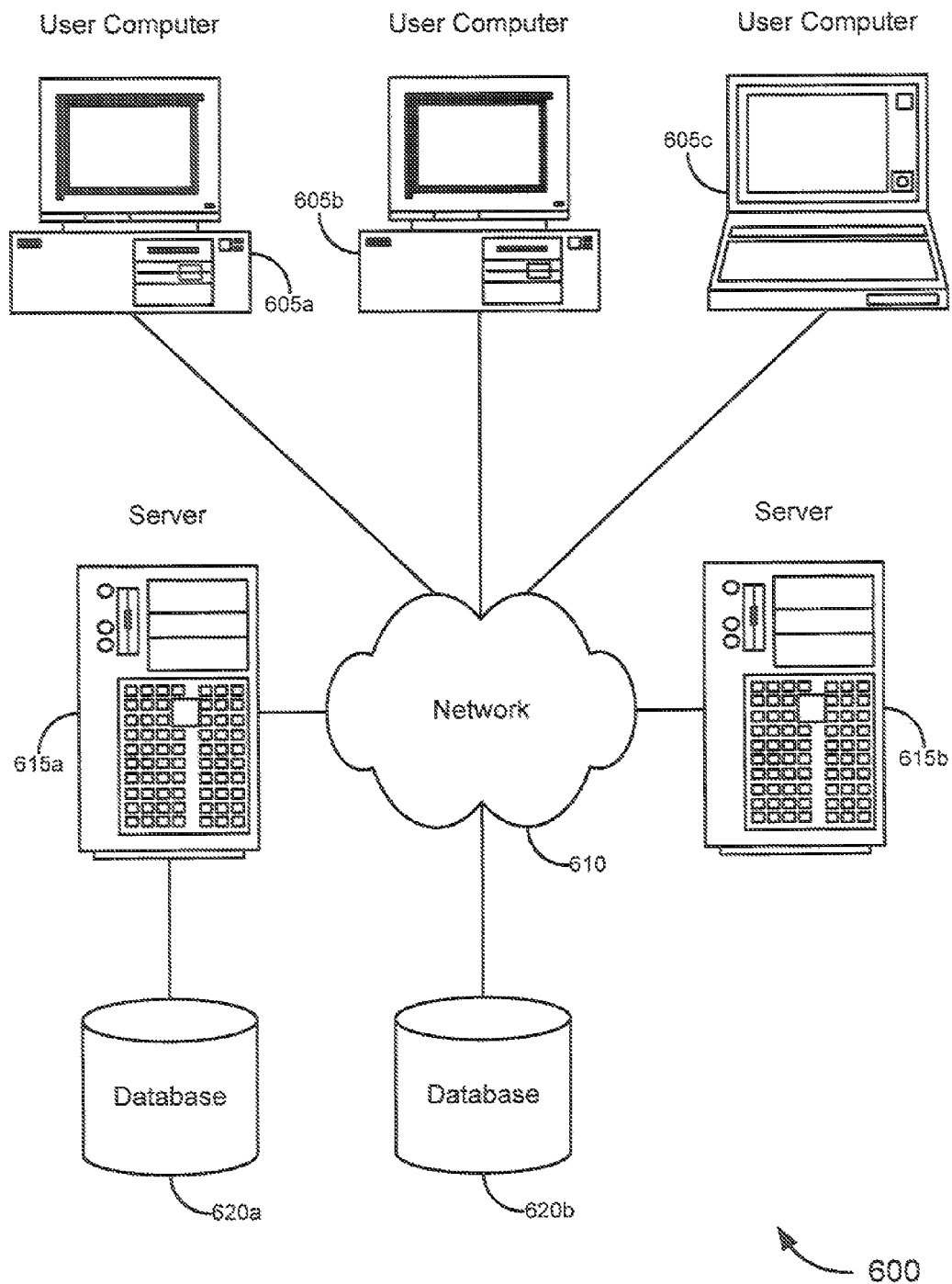
FIG. 6 is a block diagram illustrating a networked system of computers, which can be used in accordance with various embodiments of the invention.

A set of embodiments comprises systems for securely transmitting data between a client and a serve. In one embodiment, client 205, proxy server 225, or file server 235 may be implemented as computer system 600 in FIG. 6. Merely by way of example, FIG. 6 illustrates a schematic diagram of a system 600 that can be used in accordance with one set of embodiments. The system 600 can include one or more user computers 605. The user computers 605 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 605 can also have any of a variety of applications, including one or more applications configured to perform methods of the invention, as well as one or more office applications, database client and/or server applications, and web browser applications. Alternatively, the user computers 605 can be any other electronic device, such as a thin-client computer, Internet-enabled mobile telephone, and/or personal digital assistant (PDA), capable of communicating via a network (e.g., the network 610 described below) and/or displaying and navigating web pages or other types of electronic documents. Although the exemplary system 600 is shown with three user computers 605, any number of user computers can be supported.

Certain embodiments of the invention operate in a networked environment, which can include a network 610. The network 610 can be any type of network familiar to those skilled in the art that can support data communications using any of a variety of commercially-available protocols, including without limitation TCP/IP, SNA, IPX, AppleTalk, and the like. Merely by way of example, the network 610 can be a local area network ("LAN"), including without limitation an Ethernet network, a Token-Ring network and/or the like; a wide-area network (WAN); a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 615. Each of the server computers 615 may be configured with an operating system, including without limitation any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 may be a web server, which can be used, merely by way of example, to process requests for web pages or other electronic documents from user computers 605. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 605 to perform methods of the invention.

The server computers 615, in some embodiments, might include one or more application servers, which can include one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including without limitation web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™ and the like, which can process requests from clients (including, depending on the configurator, database clients, API clients, web browsers, etc.) running on a user computer 605 and/or another server 615. In some embodiments, an application server can create web pages dynamically for displaying the information in accordance with embodiments of the invention. Data provided by an application server may be formatted as web pages (comprising HTML, Javascript, etc., for example) and/or may be forwarded to a user computer 605 via a web server (as described above, for example). Similarly, a web server might receive web page requests and/or input data from a user computer 605 and/or forward the web page requests and/or input data to an application server. In some cases a web server may be integrated with an application server.

In accordance with further embodiments, one or more servers 615 can function as a file server and/or can include one or more of the files (e.g., application code, data files, etc.) necessary to implement methods of the invention incorporated by an application running on a user computer 605 and/or another server 615. Alternatively, as those skilled in the art will appreciate, a file server can include all necessary files, allowing such an application to be invoked remotely by a user computer 605 and/or server 615. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620. The location of the database(s) 620 is discretionary: merely by way of example, a database 620a might reside on a storage medium local to (and/or resident in) a server 615a (and/or a user computer 605). Alternatively, a database 620b can be remote from any or all of the computers 605, 615, so long as the database can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle™ database, that is adapted to store, update, and retrieve data in response to SQL-formatted commands. The database might be controlled and/or maintained by a database server, as described above, for example.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of securely transmitting data between a client and a server, the method comprising:
   receiving, at a client proxy, an initial security message from the client, wherein the security message is to establish security between the server and the client, and wherein the client's security parameters are set to enabled and not required;
   forwarding the initial security message to the server;
   intercepting, at a proxy server, a security response from the server, wherein the response includes security data and security parameters set to enabled and required;
   extracting the security data from the security response, and using the security data to establish a secure socket connection between the proxy server and the server;
   altering the request by changing the security parameters to not enabled and not required; and
   transmitting the altered request to the client and establishing a non-secure socket connection between the proxy client and the client.

2. The method of securely transmitting data between a client and a server of claim 1, further comprising:
   receiving, at the proxy client via the non-secure socket connection, a file request directed to the server; and
   compressing the file request and transmitting it to the proxy server.

3. The method of securely transmitting data between a client and a server of claim 2, further comprising:
   decompressing, at the proxy server, the compressed file request; and transmitting the decompressed file request via the secure socket connection.

4. The method of securely transmitting data between a client and a server of claim 2 or 3, wherein the socket connections are server message block (SMB) socket connections.

5. The method of securely transmitting data between a client and a server of claim 2, wherein the file request is one or more of a file delete, file copy, file move, folder delete, folder copy, and folder move request.

6. The method of securely transmitting data between a client and a server of claim 1, wherein the security data comprises at least one of a message authentication code (MAC), a checksum, and a session key.

7. The method of securely transmitting data between a client and a server of claim 1, wherein the altered request is transmitted using the ITP transport protocol.

8. The method of securely transmitting data between a client and a server of claim 1, wherein the server is a content server.

9. The method of securely transmitting data between a client and a server of claim 8, wherein the content server comprises one or more of the following: an email server, an FTP server, a web server, a file server, and a database server.

10. The method of securely transmitting data between a client and a server of claim 1, further comprising establishing a secure socket between the proxy server and the server.

11. The method of securely transmitting data between a client and a server of claim 10, further comprising:
    transmitting a compressed version of the file request to the proxy server;
    decompressing, at the proxy server, the compressed version of the file request; and
    transmitting the decompressed file request to the server through the secure socket.

12. The method of securely transmitting data between a client and a server of claim 1, wherein the proxy client and the proxy server are connected over a high latency link.

13. The method of securely transmitting data between a client and a server of claim 12, wherein the high latency link comprises one or more of the following: a satellite link, a cellular link, a wireless link, a Bluetooth link, and an RF link.

14. The method of securely transmitting data between a client and a server of claim 1, wherein the proxy server and the server are connection over a low latency link.

15. The method of securely transmitting data between a client and a server of claim 14, wherein the low latency link comprises one or more of the following: a broadband link, a T1 link, a cable link, a digital subscriber line (DSL) link, and an analog DSL (ADSL) link.

16. A system for securely transmitting data between a client and a server, the system comprising:
    a client system including a proxy client configured to receive an initial security message from the client, wherein the client's security parameters are set to enabled and not required, and to forward the initial security message;
    a content server configured to transmit a security response, wherein the response includes security data and security parameters set to enabled and required; and
    a proxy server coupled with the content server over a low latency communications link and the client system via the proxy client over a high latency communications link, the proxy server configured to intercept the security response, extract the security data from the security response, use the security data to establish a secure socket connection between the proxy server and the content server, alter the request by changing the security parameters to not enabled and not required, and transmit the altered request to the client;

wherein the proxy client is further configured to establish a non-secure socket connection between the proxy client and the client.

17. The system for securely transmitting data between a client and a server of claim 16, wherein the proxy client is further configured to receive via the non-secure socket connection a file request directed to the content server, compress the file request, and transmit the file request to the proxy server.

18. The system for securely transmitting data between a client and a server of claim 17, wherein the proxy server is further configured to decompress the compressed file request and transmit the decompressed file request to the proxy client via the secure socket connection.

19. A non-transitory machine-readable medium for securely transmitting data between a client and a server having sets of instructions which, when executed by a machine, cause the machine to:

receive, at a client proxy, an initial security message from the client, wherein the security message is to establish security between the server and the client, and wherein the client's security parameters are set to enabled and not required;

forward the initial security message to the server;

intercept, at a proxy server, a security response from the server, wherein the response includes security data and security parameters set to enabled and required;

extract the security data from the security response, and using the security data to establish a secure socket connection between the proxy server and the server;

alter the request by changing the security parameters to not enabled and not required; and transmit the altered request to the client and establishing a non-secure socket connection between the proxy client and the client.

20. The non-transitory machine-readable medium for securely transmitting data between a client and a server, wherein the sets of instructions which when further executed by the machine, cause the machine to;

receive, at the proxy client via the non-secure socket connection, a file request directed to the server; and compress the file request and transmitting it to the proxy server.

* * * * *